United States Patent
Grall

(12) 
(10) Patent No.: US 6,632,506 B1
(45) Date of Patent: *Oct. 14, 2003

(54) HIGH-VISIBILITY TRACTION TAPE HAVING EMBEDDED PARTICLE TRACTION SURFACE

(75) Inventor: Terrand B. Grall, Plymouth, WI (US)

(73) Assignee: Consumer Care Products Inc., Sheboygan, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/065,253

(22) Filed: Apr. 23, 1998

(51) Int. Cl.[7] .................................................. B44B 5/08
(52) U.S. Cl. ........................ 428/141; 428/67; 428/168
(58) Field of Search ...................... 428/67, 40.1, 40.2, 428/40.4, 41.7, 41.8, 42.1, 41.6, 168, 141, 143, 149

(56) References Cited

U.S. PATENT DOCUMENTS

| | | | | |
|---|---|---|---|---|
| 2,106,399 A | * | 1/1938 | Beaumont et al. .............. | 20/79 |
| 3,399,607 A | * | 9/1968 | Eigenmann .................... | 94/1.5 |
| 3,587,415 A | | 6/1971 | Eigenmann .................... | 94/1.5 |
| 3,746,425 A | | 7/1973 | Eigenmann ................. | 350/109 |
| 3,782,843 A | | 1/1974 | Eigenmann .................... | 404/9 |
| 3,935,365 A | | 1/1976 | Eigenmann ................. | 428/323 |
| 4,058,942 A | * | 11/1977 | Naka ........................... | 52/179 |
| 4,102,562 A | * | 7/1978 | Harper et al. ................ | 350/105 |
| 4,289,819 A | | 9/1981 | Kalman ......................... | 428/57 |
| 4,425,176 A | * | 1/1984 | Shibano et al. ........ | 156/244.11 |
| 4,443,510 A | * | 4/1984 | Watt ............................ | 428/149 |
| 4,533,592 A | * | 8/1985 | Bingham ..................... | 428/213 |
| 4,612,606 A | | 9/1986 | Roberts ....................... | 362/146 |
| 4,749,191 A | | 6/1988 | Gipson et al. .......... | 280/164 A |
| RE32,819 E | * | 1/1989 | Waugh ......................... | 428/31 |
| 4,937,127 A | * | 6/1990 | Haenggi et al. ............ | 428/128 |
| 4,988,555 A | * | 1/1991 | Hedblom .................... | 428/172 |
| 5,103,608 A | | 4/1992 | Andreo ........................ | 52/179 |
| 5,475,951 A | | 12/1995 | Litzow ......................... | 52/177 |
| 5,620,775 A | * | 4/1997 | LaPerre ...................... | 428/149 |
| 5,643,669 A | * | 7/1997 | Tsuei .......................... | 428/354 |
| 5,645,912 A | | 7/1997 | Nelson et al. ................ | 428/67 |
| 5,679,437 A | * | 10/1997 | Hackworth et al. ......... | 428/143 |

OTHER PUBLICATIONS

Spring/Summer 1996 Seton Identification Products Catalog, p. BE30.

3M Safety–Walk Slip–Resistant Materials—Technical Data (1996).

3M Scotchlite Reflective Material—Brochure—We put you in the driver's eye.

3M Scotchlite Reflective Fabric—Product Bulletin (1995).

3M Scotchlite Reflective Ink for Fabric—Product Bulletin (1995).

3M Scotchlite Reflective Sheeting Diamond Grade Series 3970—Product Bulletin 3970 (Sep., 1992).

3M Scotchlite Reflective Marking Film (Pressure—Sensitive Adhesive Backed) 8810—Product Bulletin (1994).

3M Traction Systems—Brochure (1995).

* cited by examiner

*Primary Examiner*—Harold Pyon
*Assistant Examiner*—Alicia Chevalier
(74) *Attorney, Agent, or Firm*—Michael Best & Friedrich LLP

(57) ABSTRACT

A high-visibility traction tape includes a substrate having opposed surfaces. Adhesive and a removable backing are attached to one of the opposed surfaces. Embedded into the other of the opposed surfaces is an array of slip-resistant ceramic particles to provide a high-friction surface. A high-visibility surface is created by coating the other of the opposed surfaces with a reflective ink or attaching a reflective tape or a plastic strip to the substrate.

8 Claims, 2 Drawing Sheets

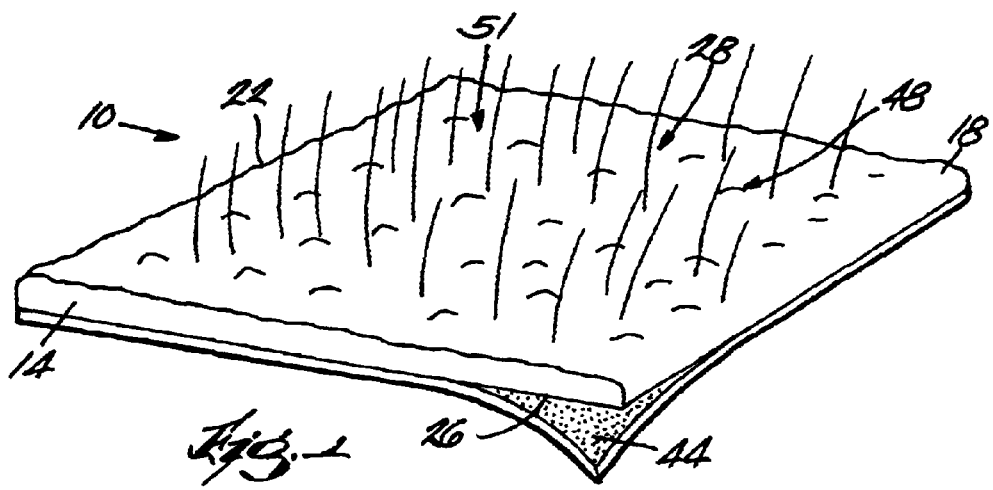
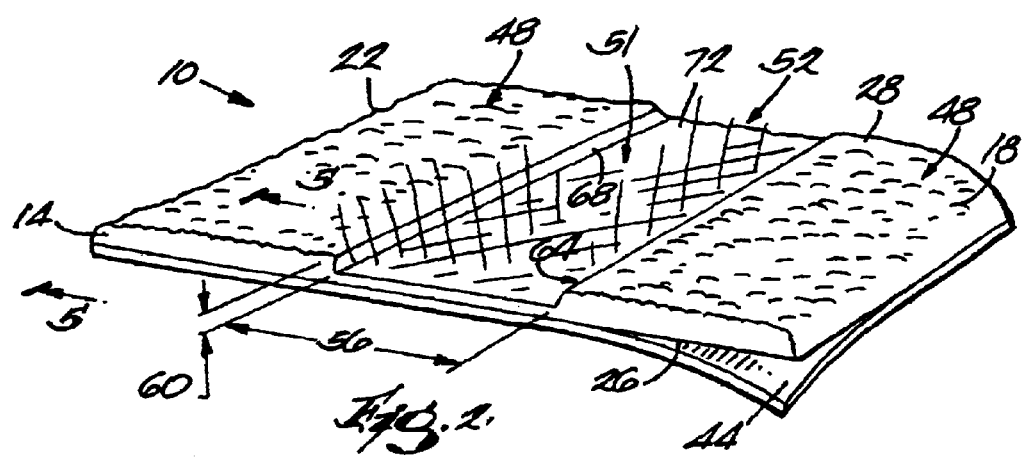
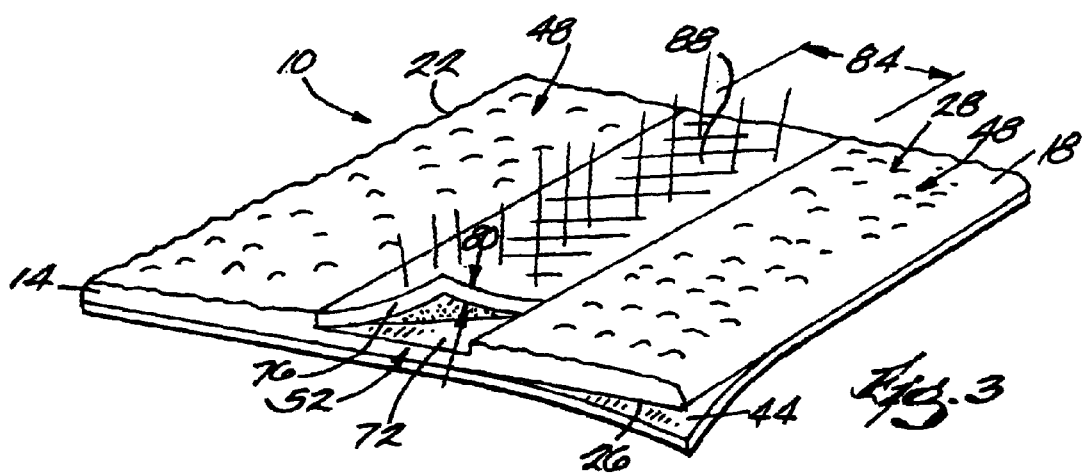

HIGH-VISIBILITY TRACTION TAPE HAVING EMBEDDED PARTICLE TRACTION SURFACE

BACKGROUND OF THE INVENTION

This invention relates to tape that combines a high-friction slip-resistant surface for traction and a reflective surface for high-visibility.

SUMMARY OF THE INVENTION

A high-visibility traction tape is provided which includes a substrate made of extruded plastic having opposed surfaces. An adhesive is affixed to one of the opposed surfaces, and the other of the opposed surfaces includes a slip-resistant surface and a high-visibility surface. The slip-resistant surface is provided by particles embedded into the extruded plastic substrate.

The high-visibility surface may be provided by attaching a tape having a reflecting surface to the substrate, impregnating into the substrate an ink containing reflective glass beads, or attaching to the substrate an extruded strip of plastic having a reflecting surface. The high-visibility surface may be positioned in a channel in the other of the opposed surfaces of the substrate, and may either be flush with the slip-resistant surface, or project a different distance from the substrate than the slip-resistant surface.

It is an advantage of the present invention to provide a tape that can be easily attached to a support surface on a walkway, and that exhibits both slip-resistant and high-visibility characteristics.

BRIEF DESCRIPTION OF THE DRAWINGS

FIG. 1 is a perspective view of the high-visibility traction tape incorporating reflective ink.

FIG. 2 is a perspective view of the invention incorporating reflective ink in a channel formed in the substrate.

FIG. 3 is a perspective view of the invention incorporating reflective tape film in the channel.

Figure 4:
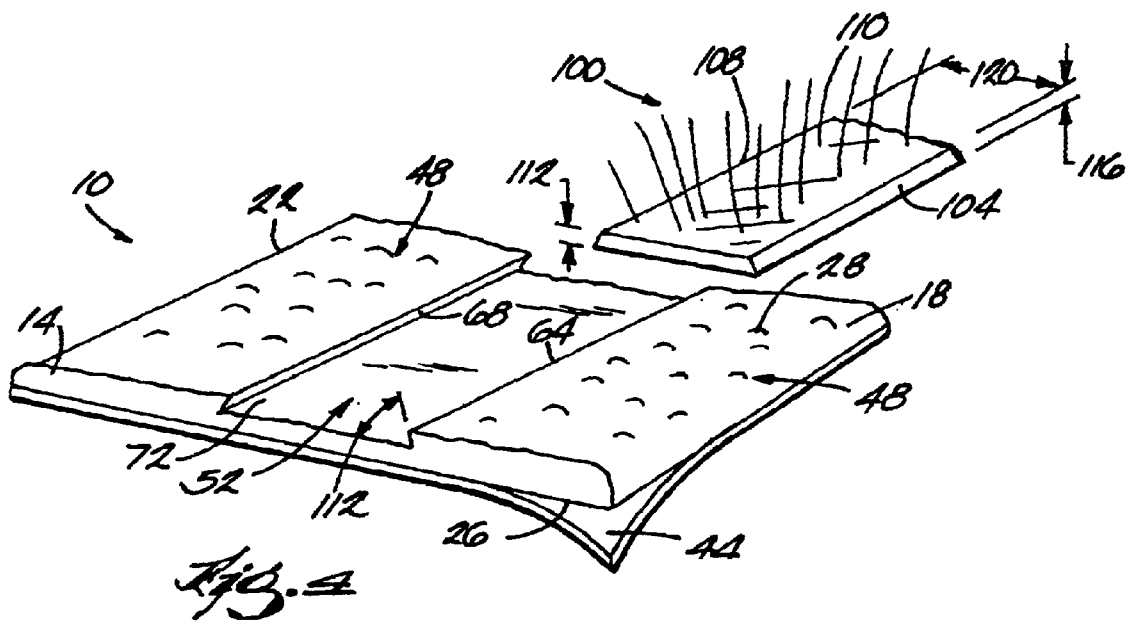
FIG. 4 is a perspective view of the invention incorporating a reflective strip of extruded plastic in the channel

Before the invention is explained in detail, it is to be understood that the invention is not limited in its application to the details of the construction and arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION

Figure 5:
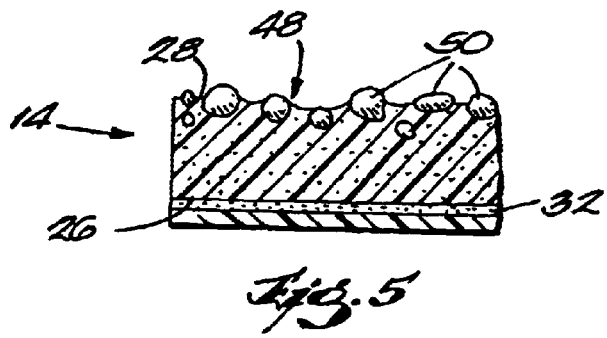
FIG. 5 is a section view taken along line 5—5 in FIG. 2.
Figure 6:
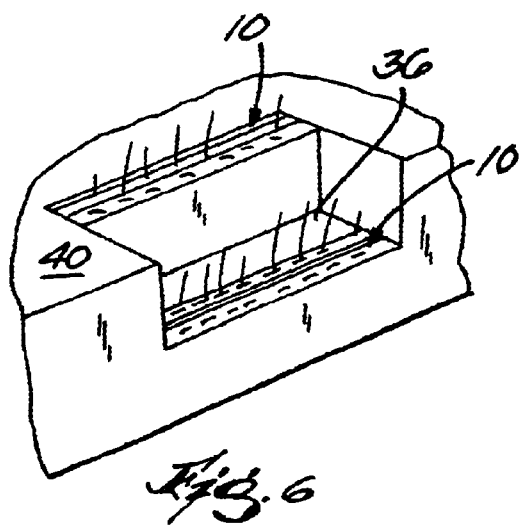
FIG. 6 is a perspective view of the invention as used in an intended environment.

FIGS. 1–6 illustrate a high-visibility traction tape (HVTT) 10 including an extruded plastic substrate 14, which is preferably vinyl. The substrate 14 has first and second edges 18, 22 and first and second opposed surfaces 26, 28 extending between the edges 18, 22. In the preferred embodiment, the edges 18, 22 are generally parallel, although the HVTT 10 can be constructed or cut into virtually any shape. As seen in FIG. 5, an adhesive 32 is provided on the first surface 26. The adhesive 32 is intended to facilitate attachment of the substrate 14 to a support surface on a walkway either indoors or outdoors (e.g., the steps in a stairway, a doorway, the rungs of a ladder, a wheel chair ramp, a hallway, a loading dock, and the deck of a ship). FIG. 6 illustrates the HVTT 10 attached to a support surface 36 on a stairway 40.

The adhesive 32 may be any suitable adhesive, but a liquid-based pressure-sensitive adhesive is preferred. The adhesive 32 may be applied along the entire first surface 26, or may be applied at intervals along the first surface 26. The pressure-sensitive adhesive 32 is preferably pre-activated with a conventional heat gun (not shown), or other suitable means, prior to applying a removable backing 44. Pre-activated adhesive 32 is attached to a support surface with less pressure than adhesive 32 that has not been pre-activated.

The invention also contemplates adhesive means other than the layer of pressure-sensitive adhesive 32 described above. For example, a two-sided adhesive tape film (not shown) having opposite-facing adhesive surfaces may supplied, and one of the opposite-facing adhesive surfaces may be attached to the first surface 26 of the substrate 14. The two-sided adhesive tape includes a removable backing on the other of the opposite-facing adhesive surfaces similar to the removable backing 44 mentioned above. A two-sided adhesive tape film suitable for this purpose is model no. 950 sold by 3M in St. Paul, Minn.

A slip-resistant high-friction surface 48 is included in the second surface 28 of the substrate 14. As best seen in FIG. 5, the high-friction slip-resistant surface 48 includes an array of particles 50 embedded into the second surface 28. Suitable particles 50 include spherical ceramic particles.

As shown in FIG. 1, the slip resistant surface 48 extends across the entire second surface 28. A reflective ink is applied to the second surface 28, thereby creating a high-visibility or reflective surface 51. A suitable reflective ink is model no. 8010, available from 3M of St. Paul, Minn., which includes microscopic glass beads.

As an alternative, and as illustrated in FIGS. 2–4, the plastic substrate 14 is extruded with a longitudinal track or channel 52, and the particles 50 are embedded into the second surface 28 along either side of the channel 52. The channel 52 is preferably formed in the substrate 14 substantially parallel to the side edges 18, 22. The channel 52 is formed during extrusion of the substrate 14. The channel 52 has a width 56 and a depth 60, and includes generally parallel side walls 64, 68 and a bottom surface 72.

In one embodiment, illustrated in FIG. 2, the bottom surface 72 of the channel 52 is treated with the reflective ink to create an elongated high-visibility surface 51.

In another embodiment, illustrated in FIG. 3, a reflective tape film 76 is in-line bonded in the channel 52 with heat and pressure either simultaneously with extrusion of the substrate 14 or at a later stage in the manufacturing process. Suitable reflective tape film 76 includes model no. 8810 and model no. 3970, available from 3M in St. Paul, Minn. The reflective tape film 76 may be of a type having microscopic wide-angle lenses, prismatic lenses, or iridescent reflective material to provide high visibility.

The reflective tape film 76 has a thickness 80 and width 84 that are substantially equal to the respective depth 60 and width 56 of the channel 52. The reflective tape film 76 therefore fits snugly into the channel 52 and is substantially flush with the textured slip-resistant surface 48 of the substrate 14.

The reflective tape film 76 may also have a thickness 80 that is less than the depth 60 of the channel 52, thereby locating a top surface 88 of the reflective tape film 76 below the textured surface 48 of the substrate 14. In this configuration, the reflective tape film 76 is better protected from wear. Alternatively, the reflective tape film 76 may have a thickness 80 greater than the depth 60 of the channel 52, causing the reflective tape film 76 to extend out of the channel 52, thereby providing higher visibility of the HVTT 10.

As a substitute for the reflective tape film 76, a plain back reflective material can be secured in the channel 52 with an adhesive, such as the adhesive 32 or the two-sided tape film mentioned above. A suitable plain back reflective material is model no. 8986 available from 3M in St. Paul, Minn.

In another embodiment, shown in FIG. 4, a plastic insert 100 is extruded having side edges 104, 108 and sized to fit in the channel 52. The reflective ink or tape 76 described above is applied to the insert 100, to create a high-visibility or reflective surface 110. The plastic insert 100 is then fitted into the channel 52. The channel walls 64, 68 and edges 104, 108 of the insert 100 may be angled, bevelled, or dovetailed at an angle 112 as shown to ensure the insert 100 remains secure in the channel 52.

The insert 100 has a thickness 116 and a width 120, and, as mentioned above with respect to the reflective tape film 76, the thickness 116 of the insert 100 may be selected to be greater or less than the depth 60 of the channel 52 to achieve the desired characteristics of the HVTT 10. The adhesive 32 or two-sided tape film mentioned above may also be applied to the insert 100 to ensure that the insert 100 remains fixed in the channel 52.

What is claimed is:

1. A high-visibility traction tape for use on a walkway, the high-visibility traction tape comprising:

a substrate having first and second opposed surfaces;

adhesive on the first surface, the adhesive being adapted to secure the substrate to a supporting surface;

a plurality of slip-resistant ceramic particles embedded in and extending away from the second surface; and a reflective ink impregnated into the second surface.

2. The high-visibility traction tape of claim 1, wherein the substrate is an extruded plastic.

3. The high-visibility traction tape of claim 2, wherein the extruded plastic is vinyl.

4. The high-visibility traction tape of claim 1, wherein the ceramic particles are spherical.

5. The high-visibility traction tape of claim 1, wherein the second surface includes first and second elongated portions, and wherein the reflective ink is impregnated in the first elongated portion and the slip-resistant particles are embedded into the second elongated portion.

6. The high-visibility traction tape of claim 5, wherein the second surface includes a channel, and wherein the channel includes the first elongated portion.

7. The high-visibility traction tape of claim 5, wherein the first and second elongated portions abut each other.

8. The high-visibility traction tape of claim 1, wherein the ink includes microscopic glass beads.

\* \* \* \* \*